United States Patent [19]

Louis

[11] 3,932,138

[45] Jan. 13, 1976

[54] LIQUID DECOMPOSING SYSTEM
[75] Inventor: Gerhard Louis, Hofheim, Germany
[73] Assignee: Licentia Patent-Verwaltungs-G.m.b.H., Frankfurt am Main, Germany
[22] Filed: Feb. 6, 1974
[21] Appl. No.: 440,267

[30] Foreign Application Priority Data
Feb. 13, 1973 Germany............................ 2306896

[52] U.S. Cl. .......................... 23/281; 23/282; 48/4; 136/86 C; 137/210
[51] Int. Cl.² ..... B01J 7/00; B01J 7/02; H01M 8/04
[58] Field of Search............. 23/281, 282; 136/86 C; 137/154, 206, 210; 48/4, 28

[56] References Cited
UNITED STATES PATENTS

| | | | |
|---|---|---|---|
| 3,170,295 | 2/1965 | Dryden............................ | 60/39.48 |
| 3,544,279 | 12/1970 | Winsel.............................. | 136/86 X |
| 3,594,232 | 7/1971 | Spahrbier......................... | 23/282 X |
| 3,787,186 | 1/1974 | Geres................................ | 23/282 |
| 3,803,858 | 4/1974 | Simon.............................. | 60/39.48 X |

Primary Examiner—Morris O. Wolk
Assistant Examiner—Roger F. Phillips
Attorney, Agent, or Firm—Spencer & Kaye

[57] ABSTRACT

In a liquid decomposing system including a decomposer having an inlet located at its bottom, a liquid tank having an outlet at its bottom, a reservoir connected between the outlet of the tank and the inlet of the decomposer, and a buffer and condensate vessel, the gas pressure at the outlet of the decomposer is maintained constant with the aid of a back pressure regulator connected between the vessel and the reservoir to set up constant driving pressure in the liquid inlet of the decomposer.

1 Claim, 1 Drawing Figure

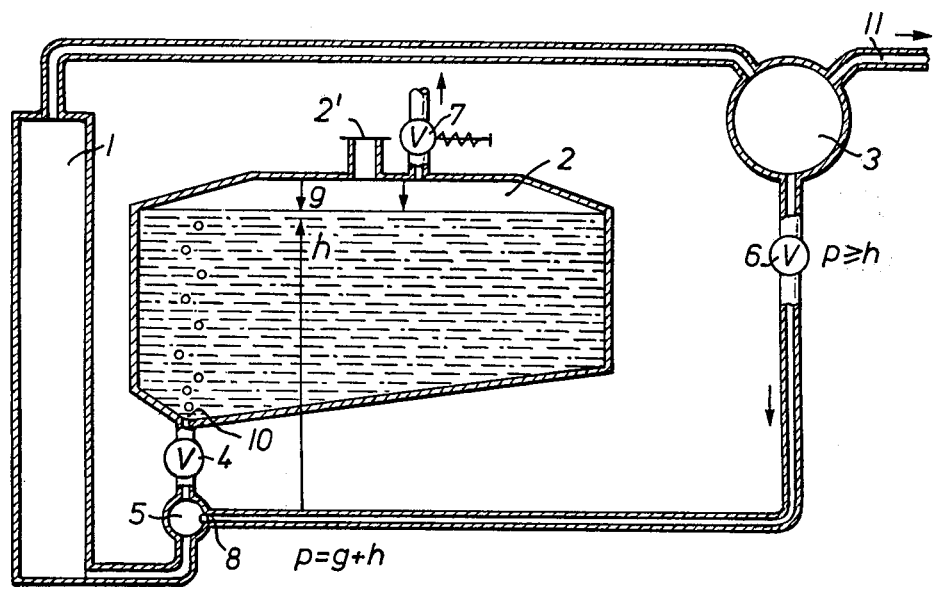

LIQUID DECOMPOSING SYSTEM

BACKGROUND OF THE INVENTION

The present invention relates to a liquid decomposing system of the type including a decomposer, a liquid tank and a buffer and condensate vessel.

As is known, the specific energy content, per unit volume, of liquid fuels is substantially greater than that of gaseous fuel. If it is desired to supply a gas which cannot be liquefied at normal temperatures, such a gas can be produced by decomposing a liquid, thus keeping the weight and volume of the fuel storage unit at lower values.

It is known, for example, to produce the hydrogen required for operating fuel cell batteries by decomposing methanol or benzene. In such a case it is necessary that the gas pressure in the load, i.e. the fuel cells, be as constant as possible, even in the event of fluctuating discharge rates, so that a correspondingly fluctuating input of liquid into the decomposer is required.

In such cases the regulation may be effected by a dosaging pump whose operation is controlled in dependence on the gas pressure produced by the decomposer in that the dosaging pump is switched on and off by a pressure switch. This, however, produces pressure fluctuations which are greater than the range between the pressure values at which the pressure switch turns the pump on and off, respectively. Also, the dosaging pump requires auxiliary electrical energy and constitutes a part subject to wear. Systems of the type under consideration generally include the decomposer, a liquid tank and a buffer and condensate vessel, and the dosaging pump is disposed between the tank and the decomposer.

SUMMARY OF THE INVENTION

It is an object of the present invention to achieve automatic regulation to a constant pressure at the decomposer outlet without employing parts subject to wear and with refilling during operation and initiation of the operation taking place without any auxiliary electrical energy.

This and other objects of the present invention are achieved by the provision of a back pressure regulator which is set to a selected operating pressure and which has its input side in communication with the gas under pressure in the buffer and condensate vessel, and which has its back pressure, or outlet, side connected to a reservoir disposed below the liquid tank, which reservoir has one opening connected to the outlet of the tank, via a shutoff valve. The reservoir has a further opening, via which the reservoir is connected directly to the decomposer inlet located at the bottom of the decomposer. The back pressure regulator is of a type which permits fluid to set up constant driving pressure in the liquid inlet of the decomposer.

BRIEF DESCRIPTION OF THE DRAWING

The single FIGURE is a schematic pictorial view of a preferred embodiment of the invention.

DESCRIPTION OF THE PREFERRED EMBODIMENTS

The system illustrated in the FIGURE includes a known decomposer 1, a known liquid tank 2 provided with a closeable fill opening 2', and a known buffer and condensate vessel 3 provided with an outlet 11 for the gas consumption unit (not shown), which may for example be a gas fuel cell battery.

According to the present invention, a shutoff valve 4 is provided at the underside of tank 2 and is connected with a small reservoir 5. This reservoir 5 is also connected directly with the inlet to decomposer 1 which is disposed at the bottom of the decomposer. Reservoir 5 is also connected, via a back pressure regulator 6, with the condensate vessel 3. Finally, a safety valve 7 is disposed at the upper end of the tank 2. The decomposable liquid capacity of reservoir 5 is selected to be sufficient for permitting refilling of tank 2 during operation.

The FIGURE also shows the required physical heights of the components with respect to one another. The input of decomposer 1 is disposed at the lowest point of the system.

The system operates as follows:

If, after filling the system, and with valve 4 open and liquid filling reservoir 5, the fixed pressure $p$ of the back pressure regulator 6 is greater than the hydrostatic pressure $h$, determined by the fill level in tank 2, gas is forced through regulator 6 and into reservoir 5, from which it bubbles through opening 10 and to the upper end of tank 2 from the buffer vessel 3 until, at the intake point 8 of the reservoir 5, the sum of the hydrostatic pressure $h$ and the gas pressure $g$ inside the tank 2 have become equal to the set, or constant, pressure $p$, i.e. $h + g = p$.

This constant pressure "$p$" drives liquid from tank 2 into decomposer 1 where the resulting gas pressure counteracts the pressure at the outlet of reservoir 5, which is essentially the same as the pressure at the outlet of tank 2. The feeding of liquid into decomposer 1 is thus very sensitive to differences between the driving pressure $p$, as the rated value, and the gas pressure in decomposer 1, as the actual value. As soon as the driving pressure $p$ at the outlet of reservoir 5 becomes higher than the pressure in decomposer 1, more liquid is fed into the decomposer 1 and thus the rate of decomposition is increased. If, however, the resulting gas pressure in the decomposer is higher than the rated valve, liquid can not flow into decomposer 1 and the decomposition rate decreases.

In order to refill the tank 2, during operation, via inlet 2', the shutoff valve 4 is closed so that the reservoir 5 can continue to provide more fuel. The reservoir 5 must here carry such a supply of liquid that the refilling time for tank 2 can be bridged, inasmuch as the operation of the system should not be interrupted during the refilling period.

Tank 2 has a fill level indicator (not shown) so that the need for refilling can be readily determined. The refilling can take place as soon as the excess pressure in tank 2 has been released via safety valve 7.

When the system is to cease operation, the shutoff valve 4 is closed in order that no equalization of the liquid levels in decomposer 1 and liquid tank 2 will take place.

The system is put into operation by starting up the decomposer 1 until the required gas pressure $p$ has been developed with the liquid present in reservoir 5, whereupon the shutoff valve 4 is opened.

A liquid decomposing system including a decomposer, a liquid tank, a buffer and condensate vessel is shown in U.K. Pat. No. 1,230,616.

Example of a decomposing system for fuel cells decomposing methanol:

a liquid tank 2 for 20 l of methanol,
a decomposer 1 with a maximum performance of 0.5 l/h methanol with a maximal flow rate of about 1000 l gas/h,
a buffer and condensate vessel 3 of 2 l,
a back pressure regulator 6 of the type "Regulus" by Dräger West Germany, fixed to a pressure p = 600 mm Wc. The fill height in the tank may be such that the liquid measured above the intake point 8 produces a pressure h up to 600 mm Wc. In the degree that this liquid pressure $h$ diminishes, gas is furnished by the back pressure regulator 6 through 8 and 4 into 2, so as to build up the gas pressure g that is added to the liquid pressure h to establish the fixed pressure value p for driving the liquid into the decomposer 1 p = g + h = constant.

The pressure variations of the gas in the buffer vessel 3 will come to maximum when the maximal flow rate is suddenly stopped or is suddenly needed again. The occuring pressure difference (drift) mainly depends on the construction of the decomposer and the volume of the total buffer room. In the application of the above described decomposing system in connection with a fuel cell of a maximum power output of 500 Watts, switching off the maximum load gave an increase of the gas pressure in the buffer vessel of maximal 15% of the nominal pressure value of 600 mm Wc. In the case of normal variation of the fuel cell load within a range of 30 % the gas pressure remains constant with less than 5 % of fluctuation.

It will be understood that the above description of the present invention is susceptible to various modifications, changes and adaptations, and the same are intended to be comprehended within the meaning and range of equivalents of the appended claims.

I claim:

1. In a liquid decomposing system including a decomposer having a liquid inlet at its bottom, said liquid inlet constituting the lowest point of the system, the decomposer further having a gas outlet, a liquid tank whose upper portion constitutes a normally hermetically sealed enclosure and having an outlet in the vicinity of its bottom, a buffer and condensate vessel having a gas inlet and a gas outlet, and conduit means connecting the decomposer gas outlet to the vessel inlet, the improvement comprising: a reservoir disposed below said tank; a shutoff valve connecting said reservoir to the outlet of said tank; a back pressure regulator, which is set to a fixed operating pressure; conduit means connecting the inlet end of said back pressure regulator to said gas outlet of said vessel; conduit means connecting the back pressure end of said regulator to said reservoir; and conduit means directly connecting said reservoir to said decomposer inlet.

* * * * *